G. A. HOWE.
Cotton Picker.
No. 2,137.
Reissued Dec. 26, 1865.
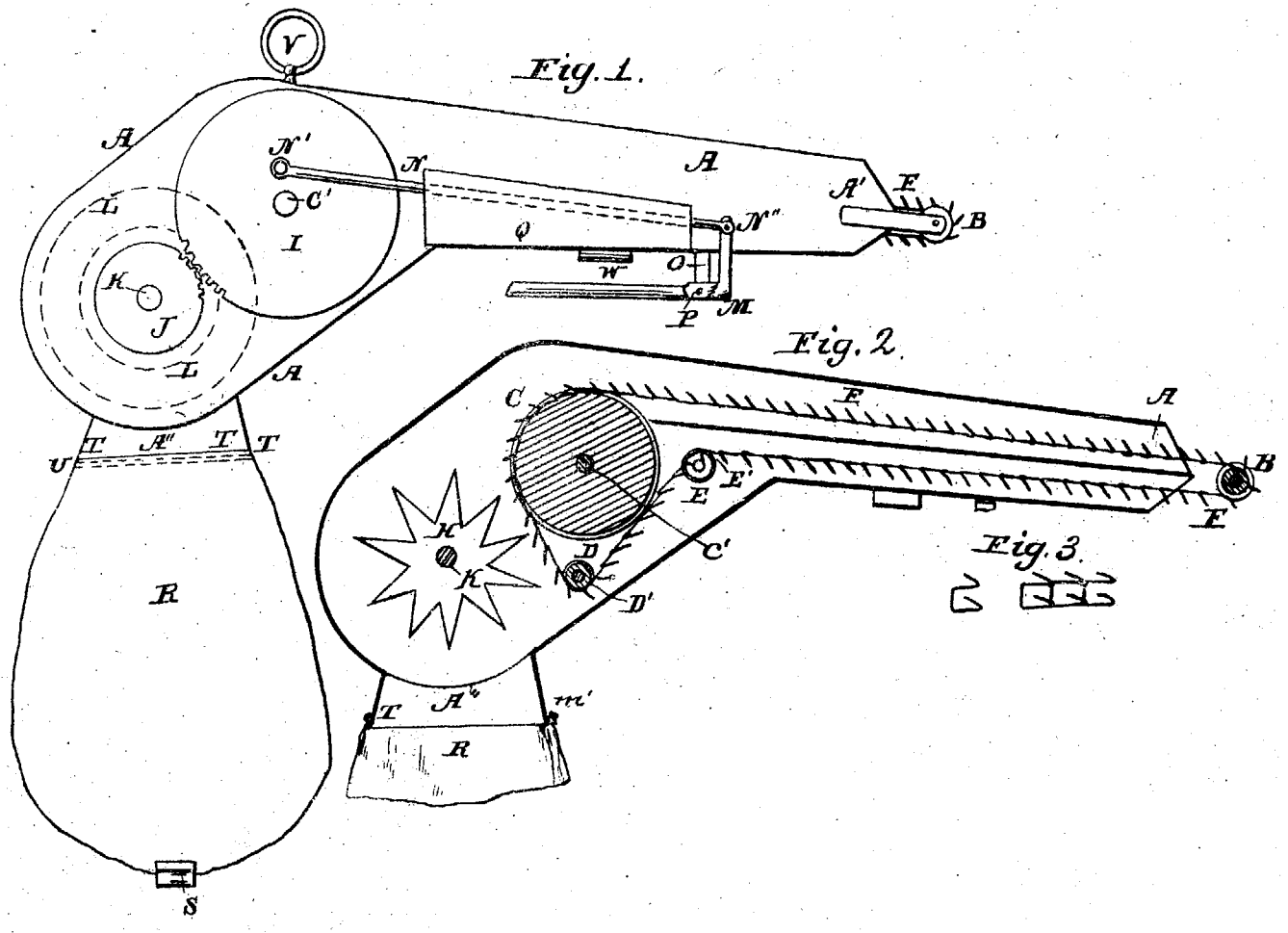
Witnesses.
John Conn
M. L. Marland
Inventor
George A. Howe
THE ECKERT LITHOGRAPHING CO., WASHINGTON, D. C.

UNITED STATES PATENT OFFICE.

GEORGE A. HOWE, OF BROOKLYN, NEW YORK.

IMPROVEMENT IN COTTON-PICKERS.

Specification forming part of Letters Patent No. 13,877, dated December 4, 1855; Reissue No. 2,137, dated December 26, 1865.

DIVISION No. 1.

*To all whom it may concern:*

Be it known that I, GEORGE A. HOWE, of the city of Brooklyn, in the county of Kings and State of New York, have invented certain new and useful Improvements in Hand Cotton-Harvesters; and I do hereby declare that the following is a full and exact description thereof, reference being had to the accompanying drawings, and the letters of reference marked thereon.

Heretofore the cotton crop has been harvested almost entirely by hand, and the labor and expense incident thereto have proved to be the greatest difficulty encountered in the production of that great staple.

To diminish this difficulty by rendering the harvesting of the cotton crop a comparatively light, expeditious, and economical operation is the object of my invention.

To enable others skilled in the art to make and use my invention, I will proceed to describe its construction and operation.

Figure 1 is a view of the hand cotton-harvester complete. Fig. 2 is a vertical and longitudinal section. Fig. 3 is a perspective view of the chain or gatherer, and of a detached link of the same.

A A A represent the exterior case of the machine; B C D E, the rollers upon and around which the chain F revolves. This chain is made of wires bent in the form represented in Fig. 3, the two ends of each link being so disposed as to form two teeth in the chain, and the chain being so constructed that it may be readily separated at any link in its whole length. This mode of constructing the chain or gatherer is deemed important, as well because of the small degree of skill or expense required for its manufacture as for the facility it affords for repairs, or for increasing or diminishing the length of a chain to adapt it to machines of different lengths to suit the diverse preferences of laborers in the field. The rollers B C D E revolve upon their respective shafts B′ C′ D′ E′. As the chain rotates upon these rollers by the operation hereinafter to be described it comes in close proximity to the wheel H in Fig. 2, which, revolving in a direction the reverse of that of the chain, acts as a stripper, detaching from the chain-teeth the cotton conveyed on them to that point.

On the shaft C′ is a gear, I, which meshes into a smaller gear, J, on the shaft K of the stripper H, by means of which the stripper is made to revolve faster than the chain.

The dotted lines L, Fig. 1, represent a fly or balance wheel, which is secured to the shaft K at the end opposite to the one shown in the drawings, and which revolves in a case attached to that side of the machine. The gears I and J are also protected by a case or cover in a similar manner. The large gear I is connected to the right-angled lever M by the rod N by means of a joint at N′ and at N″. The lever M has a pin-joint, P, which acts as a fulcrum in the standard O, which standard is secured to the case or tube. By the action of the lever M, in combination with the rod N, the gear I is revolved, by which means the movements are given to the various parts of the machine.

Q represents a case or covering through which the connecting-rod N passes. If considered preferable, the gear I may be revolved by a pin or handle secured to it at N′, instead of the lever and connecting-rod.

The throat A″ of the machine is made flaring, and to it is attached the bag R, which is so constructed that by removing the clasp S the two sides will open at the bottom and deliver the contents.

To operate the picker or harvester the strap, which is passed through the ring V, is put over one shoulder and passed under the opposite arm, the machine being well drawn up under the arm. The arm is then extended, the thumb placed in the ring W, secured to the under part of the case, and the hand-lever N operated. The roller B, placed at the extremity of the tubular part of the case, is then presented to the cotton-boll, from which the cotton is detached by the chain-teeth and conveyed by the revolving chain to the stripper H, which relieves it from the chain-teeth, and it falls into the bag R.

What I claim as my invention, and desire to secure by this division of my Letters Patent, is—

1. In a hand cotton-harvester, an endless toothed chain with a rotary motion to detach and gather the cotton from the boll, substantially as described.

2. The endless toothed chain or gatherer F, in combination with an exterior case or frame, A, a stripper, H, and a bag or other receptacle, R, constructed and arranged substantially as and for the purposes described.

GEORGE A. HOWE.

In presence of—
JOHN COON,
J. J. COOMBS.